US012556608B2

(12) United States Patent
Bakke et al.

(10) Patent No.: US 12,556,608 B2
(45) Date of Patent: Feb. 17, 2026

(54) ADAPTABLE COMMUNICATION SYSTEM FOR A VESSEL

(71) Applicant: DIMEQ AS, Bremanger (NO)

(72) Inventors: Ronny Bakke, Kalvåg (NO); Jacek Lach, Gliwice (PL)

(73) Assignee: DIMEQ AS, Bremanger (NO)

( * ) Notice: Subject to any disclaimer, the term of this patent is extended or adjusted under 35 U.S.C. 154(b) by 0 days.

(21) Appl. No.: 18/708,778

(22) PCT Filed: Nov. 9, 2022

(86) PCT No.: PCT/NO2022/050251
§ 371 (c)(1),
(2) Date: May 9, 2024

(87) PCT Pub. No.: WO2023/085944
PCT Pub. Date: May 19, 2023

(65) Prior Publication Data
US 2025/0016232 A1    Jan. 9, 2025

(30) Foreign Application Priority Data
Nov. 9, 2021   (NO) .................................. 20211352

(51) Int. Cl.
*H04L 67/12*       (2022.01)
*H04L 41/06*       (2022.01)
(Continued)

(52) U.S. Cl.
CPC ............ *H04L 67/12* (2013.01); *H04L 41/082* (2013.01); *H04L 41/06* (2013.01); *H04L 43/0888* (2013.01)

(58) Field of Classification Search
CPC ..... H04L 41/0856; H04L 69/18; H04L 45/72; H04L 45/48; H04L 41/082; H04L 67/12;
(Continued)

(56) References Cited

U.S. PATENT DOCUMENTS

| 2015/0110130 A1 | 4/2015 | Vedantham et al. |
| 2015/0180772 A1* | 6/2015 | Hui ...................... H04W 40/16 370/389 |
| 2017/0034316 A1* | 2/2017 | Pei ...................... H04L 41/0856 |

FOREIGN PATENT DOCUMENTS

| CN | 108494681 A | 9/2018 |
| CN | 105852817 B | 10/2018 |

(Continued)

OTHER PUBLICATIONS

Norwegian Industrial Property Office, Norwegian Search Report issued in corresponding Patent Application No. 20211352 on Jun. 8, 2022, 3 pages.

(Continued)

*Primary Examiner* — Mahran Y Abu Roumi
(74) *Attorney, Agent, or Firm* — J. Peter Paredes; Amin Wasserman Gurnani LLP

(57) ABSTRACT

Described herein is an adaptable communication system for a vessel comprising: a network of gates, each gate comprising at least one wireless interface coupled to a wireless transmission line for wireless communication with another gate of the network and at least one wired interface coupled to a wired transmission line for wired communication with another gate of the network; wherein the gates are each configured to: while the system is in operation, repeatedly update a current gate status based on at least one current property of the wired and wireless transmission lines or at least one current property of the wired and wireless interfaces; receive a data package; select a transmission line based on the current gate status; and send the data package onwards towards a destination via the selected transmission line. Also described herein is a gate for an adaptable communication system and a method for communication in an adaptable system.

16 Claims, 3 Drawing Sheets

(51) Int. Cl.
*H04L 41/082* (2022.01)
*H04L 43/0888* (2022.01)

(58) Field of Classification Search
CPC ........ H04B 3/54; H04W 48/18; H04W 40/16; H04W 88/06
See application file for complete search history.

(56) References Cited

FOREIGN PATENT DOCUMENTS

| | | |
|---|---|---|
| EP | 1489801 A1 | 12/2004 |
| EP | 3125614 A1 | 2/2017 |
| KR | 100886847 B1 | 3/2009 |
| KR | 101304426 B1 | 9/2013 |
| KR | 20160012535 A | 2/2016 |
| KR | 20170007639 A | 1/2017 |
| KR | 20200030917 A | 3/2020 |
| WO | 2011056833 A1 | 5/2011 |
| WO | 2015149122 A1 | 10/2015 |
| WO | 2019006503 A1 | 1/2019 |

OTHER PUBLICATIONS

Norwegian Industrial Property Office, Office action issued in corresponding Patent Application No. 20211352 on Jun. 6, 2022, 7 pages.
WIPO/ISA/EPO, International Search Report and Written Opinion issued in corresponding application, PCT/NO2022/050251 on Feb. 23, 2023, 9 pages.
WIPO/IPEA/EPO, Written Opinion issued in corresponding application, PCT/NO2022/050251 on Sep. 20, 2023, 8 pages.
WIPO/IPEA/EPO, International Preliminary Report on Patentability issued in corresponding application, PCT/NO2022/050251 on Feb. 19, 2024, 39 pages.

* cited by examiner

ADAPTABLE COMMUNICATION SYSTEM FOR A VESSEL

CROSS-REFERENCE TO RELATED APPLICATIONS

The present application claims priority to PCT application serial no. PCT/NO2022/050251, filed Nov. 9, 2022, which claims priority to Norwegian patent application No. 20211352, filed Nov. 9, 2021, each herein incorporated by reference in their entireties.

The present invention relates to a communication system. In particular, the present invention relates to an adaptable communication system for a vessel, which integrates several communication technologies in a flexible manner.

In situations where crew members or personnel, as well as potentially larger numbers of passengers or public, need to be monitored for safety reasons, the efficiency and range of the communication system used to send data from one area of a monitored location to another is crucial. The efficient sending of data is particularly difficult to achieve on a marine vessel, such as a cruise ship or working vessel. This is because, when the vessel is not docked, the availability of external networks may vary depending on vessel position or changing environmental conditions. The structure of this type of vessel can also make the provision of communication systems more difficult than on land. Rooms are often separated by steel walls, for example, which can hamper wireless communication in some areas.

Some systems have improved communication possibilities onboard vessels by utilising powerlines already present on the ship to send data between different areas. Communication below deck may use powerlines, and communication with locations remote from the vessel may be by wireless means. KR-A-100886847 describes a system in which PLC is used exclusively in areas of the ship where use of a Zigbee® network is not possible. Interface modules are used to convert from a wireless signal to PLC for provision to a control computer. KR-A-101304426 describes a very similar system including master and slave devices. Slave devices are plugged into power sockets and are able to communicate with each other only via PLC (and via the master device). Such systems are not, however, fully adaptive and therefore cannot provide the most efficient communication. This is particularly true onboard vessels in transit, where the availability of wireless and other networks may vary hour by hour.

According to a first aspect of the present invention, there is provided an adaptable communication system for a vessel comprising: a network of gates, at least one gate comprising at least one wireless interface coupled to a wireless transmission line for wireless communication with at least one other gate of the network, and at least one wired interface coupled to a wired transmission line for wired communication with at least one other gate of the network; wherein the at least one gate is configured to: while the system is in operation, repeatedly update a current gate status based on at least one current property of the wired and wireless transmission lines or at least one current property of the wired and wireless interfaces; receive a data package; select a transmission line based on the current gate status; and send the data package onwards towards a destination via the selected transmission line.

Reference to the gate being configured to perform the actions described above is to the gate comprising an updating means for repeatedly updating a current gate status based on at least one current property of the wired and wireless transmission lines or at least one current property of the wired and wireless interfaces, a receiving means for receiving a data package, a selection means for selecting a transmission line based on the current gate status, and a sending means for sending the data package onwards towards a destination via the selected transmission line. The at least one other gate of the network may be a gate of the same type. The updates may be carried out automatically by the gate based on a fixed time period or a fixed number of data packets being sent through the gate, or may be carried out in response to repeated command signals from a central controller. These command signals may also be periodic or may be sent each time a particular number of data packages has been sent through the gate. The update may result in no change in the gate status in some cases, for example if there has been no or little change in the current properties of the wired and wireless transmission lines, or of the wired and wireless interfaces. Reference to the network being in operation may refer to at least two or all gates of the network being active in that they are in a state to receive and transmit data. The gate status updates may be carried out for all of the active gates in the network and may be carried out repeatedly whenever the gate is active. The property of both wired and wireless transmission lines or both wired and wireless interfaces will therefore be determined regularly at each gate status update throughout the time during which the gate is active to send and receive data.

Reference to the updating of the gate status being carried out "repeatedly" refers to the fact that the properties of the wired and wireless transmission lines or the properties of the wired and wireless interfaces are checked or measured, and the gate status updated in response to the measured values, at intervals (recurrently) throughout a time period during which the system is in continuous operation and is functioning to or is ready to transport data. The properties of both the wired and wireless interfaces or of both the wired and wireless transmission lines are therefore determined or measured each time a gate status update is carried out. The intervals may be regular or intermittent. These intervals may be based on a particular time interval or number of data packages sent through the gate, and may be the same for each interval between pairs of updates or may change randomly or according to a predefined pattern. The size of the intervals may be fixed to a particular length of time, may represent a varying length of time, may correspond to a fixed number of data packages being sent through the gate, or may correspond to a varying number of data packages being sent through the gate. For example, the interval between successive gate status updates may be between 1 second and 5 minutes in duration, preferably between 5 and 60 seconds, more preferably between 5 and 30 seconds, and most preferably every around 10 seconds. The interval between successive gate status updates may be fixed at a particular value within the above time period ranges.

In embodiments, the at least one gate comprises at least one wireless interface coupled to a wireless transmission line for wireless communication with at least one other gate of the network, and at least one wired interface coupled to a wired transmission line for wired communication with at least one other gate of the network; and each gate is configured to: while the system is in operation, repeatedly update a current gate status based on at least one current property of the wired and wireless transmission lines or at least one current property of the wired and wireless interfaces; receive a data package; select a transmission line based on the current gate status; and send the data package onwards towards a destination via the selected transmission line. This may be true for each gate of the network if several gates of the same type are present. The network comprises two or more gates, and is usually made up of a large number of gates covering an area.

In embodiments, the fixed number of data packages is between 1 and 20,000, more preferably between 2 and 10,000, still more preferably between 2 and 5000, between 5 and 5000, between 5 and 1000, or around 100. The intervals between gate status updates may therefore correspond to the sending of between 1 and 20,000 data packages through the gate, more preferably between 2 and 10,000 data packages, still more preferably between 2 and 5000 data packages, still more preferably between 5 and 5000 data packages, still more preferably between 5 and 1000 data packages, and most preferably around 100 data packages. The intervals between gate status updates may correspond to the sending of a certain number of packets by the whole network, preferably between 1 and 20,000, more preferably between 2 and 10,000, still more preferably between 2 and 5000, and most preferably around 100 data packets. Updating the gate status every time a fixed number of data packages has passed through the gate is particularly advantageous in that updates will be more regular for gates which are more used, which is obviously very efficient. The gates may comprise a package counting means for counting the number of packages passing through the gate. No additional knowledge of the external network is provided to carry out status updates based on either a fixed time period or a fixed number of data packages passing through the specific gate.

In embodiments, the at least one gate is configured to: whenever the system is in operation and the gate is active, measure a property of the wired and wireless transmission lines or a property of the wired and wireless interfaces and update a current gate status based on the measured property. This, again, may be true for each gate of the network if several gates of the same type are present. The measuring of the property may be carried out repeatedly. In embodiments, the gate comprises measurement means configured to take a measurement of a property of the wired and wireless interfaces or the wired and wireless transmission lines. The measurement is taken at (and by) the gate itself, and represents a measurement of a property of the interface of the gate or of the local transmission line connected to it. The measured property can be a property of the data connection provided by the wired or wireless transmission lines that is directly measurable by the gate. The measured property can be a transmission speed for a direct connection (either wired or wireless) to a second adjacent gate of the system, for example. Only information relating to components directly coupled to or forming part of the gate itself are required for the system to function, rather than information regarding functioning of the whole network being required. Each gate in the network can be similarly configured to measure properties of the wired and wireless interfaces or wired and wireless transmission lines out of that gate, and to update a current gate status based on the measured property.

The gate status may be updated each time a measurement is taken based on the measurement, and measurements may be taken after fixed time intervals or after a fixed number of packets has passed through the gate, as mentioned above. The interval between successive, measurements by the gate may be between 1 second and 5 minutes in duration, preferably between 5 and 60 seconds, more preferably between 5 and 30 seconds, and most preferably around 10 seconds. If measurements are taken each time a fixed number of data packages passes through the gate, the fixed number of data packages may be between 1 and 20,000, more preferably between 2 and 10,000, still more preferably between 2 and 5000, between 5 and 5000, between 5 and 1000, or around 100. The intervals between measurements may instead correspond to the sending of a certain number of packets by the whole network, preferably between 1 and 20,000, more preferably between 2 and 10,000, still more preferably between 2 and 5000, and most preferably around 100 data packets.

In embodiments, the wireless interface is coupled to a wireless transmission line for direct wireless communication with another gate of the network and the wired interface is coupled to a wired transmission line for direct wired communication with the other gate of the network. Both the wired and wireless transmission lines are used for communication with the same external gate, and both lines provide a direct connection with the other gate (i.e. no intervening gates or modules). The other gate of the network may be another gate of the same type.

The at least one current property of the transmission lines or of the interfaces may refer to a measured property of the transmission lines or of the interfaces (such as a transmission speed for each interface or transmission line), and the measurement may be carried out each time the gate status is to be updated, such as at the time of the status update for that particular gate or just before. The measurements can be taken by the gate itself for transmission lines or interfaces of that gate, as mentioned above. The determination of the current properties of the transmission lines or the interfaces can be carried out by each of the gates in the system in response to a command from system control. All of the gates in the network may update their status in response to this signal at the same time, or this may be done at different times. The gates may determine internally when to carry out the status update (i.e. after a particular time period has elapsed since the previous update or after a certain number of data packets have been sent through that gate since the previous update). The number of data packages may be predetermined or varying. In embodiments, the gate status of each of the gates in the network is separately updated, so that updating the gate status of one gate does not affect or change the gate status of other gates in the network. In either case, depending on how and when the statuses of the gates are updated, at any particular time the status of one gate can be such that the data package is more likely to be sent via a wired transmission line, while the status of another gate in the network can be such that a data package sent though that gate is more likely to be forwarded through a wireless transmission line. The network can include any number of gates of the type described above, with the capability to regularly update a gate status.

Updating a gate status may comprise: determining the value of the property of the wired and wireless interface or the property of the wired and wireless transmission lines; comparing the values of the property of the wired and wireless interfaces or the values of the property of the wired and wireless transmission lines; determining a gate status based on the comparison, wherein the gate status comprises a set of weightings for the wired and wireless transmission lines; and storing the gate status. The weightings may reflect the measured values of the property. For example, if a transmission speed is measured, the weighting for the transmission line with the fastest speed will be lower (or higher depending on how the weightings are applied). In most cases, a lower weighting value will mean that the transmission line is more likely to be used for transmission, or is preferred. Whenever a data package is received at the gate, the gate status information may be accessed and used to select a transmission line for onwards transmission of the data package. If a particular transmission line has a lower weighting assigned, the data package is more likely to be sent via that transmission line. In this case, when selecting between two transmission lines directly connecting a particular gate with another gate, and if no additional properties are taken into account, the transmission line with the lowest weighting based on the current gate status will be selected.

At least one of the weightings may represent a value between zero and 100. Obviously, the values 0 to 100 can be replaced with any other set of values, for example 0 to 1000 or 0 to 1, since it is the relative values for the transmission lines which will determine which are more preferred and which are less preferred. If weighting values of 0 to 100 are applied, a value of 100 assigned to a transmission line may mean that will not be used for transmission. The transmission lines may be assigned an initial default value, which can be updated or not depending on how the gate status is calculated. The weighting can be assigned based on bandwidth, delay, reliability (which can be based on a number of lost packets). Measurements of these properties of the transmission lines can allow values of the weightings to be dynamically modified (e.g. adding to the value if there is increased number of lost packets) making the interface more or less preferred. Default values can be assigned when the network is brought online in an initial setup stage, which can be the same or different for the different transmission lines.

In embodiments, the method comprises selecting a transmission line based on at least one property of the data package. The selection is based both on the current gate status and a property of the data package itself (i.e. type of data, destination, or source of the data).

The network comprises a plurality of gates. A consistent design for the gates can be used in this type of mixed network, and the gates can be connected up to form a communication system which makes use of a number of different communication technologies in an adaptable way. The above features result in a system which is easy to produce and install, which can provide coverage to regions of a vessel or a building which would not ordinarily be consistently reachable, and which does so without sacrificing speed/efficiency of data transfer. The system is particularly useful for monitoring people and/or assets on board a vessel, but can be used in other situations, such as on an oil rig, or in a factory building or another land-based environment where efficient data transfer may be required. Each time a data package is sent through a gate, a processor of the gate selects a most efficient transmission line for onwards transmission of the data. This selection can be based both on information related to the data package itself (i.e. the direction of travel through the system or type of data) and properties of the system, such as properties of the transmission lines or properties of the interfaces coupled to the transmission lines determined in the most recent gate status update or can be based only on the properties of the transmission lines or interfaces. This can occur at every gate through which the data package travels en-route from source to destination, meaning that the data package may follow a mixed path. The package can therefore be sent via wired communication between a first pair of gates, by wireless means between a second pair of gates, and so on, depending on the status each of the gates at the time of onwards transmission and in some cases also the properties of the received data package.

In embodiments, the at least two interfaces of a first gate are configured for wireless and wired communication, respectively, between the first gate and the same second gate of the network. The wireless transmission line and the wired transmission line therefore provide a direct communications link to the same other gate of the network. In this case both wireless and a wired direct connections are provided between at least one of the pairs of gates in the network. This provides the option of sending data via wireless connection or via wired connection between the two gates depending on the state of the network. In most cases, a plurality of gate pairs in the network will each be directly communicatively connected by both wired and wireless transmission lines through different interfaces. All of the gate pairs in the network may be connected by both wired and wireless direct connection, or only some of the pairs may be connected with both wired and wireless direct connection and other pairs by only wired, or only wireless, direct connection. This will depend on the structure and layout of the vessel. In embodiments, the gate is configured to receive the data package via a transmission line that does not include the at least one interface for wireless communication and the at least one interface for wired transmission. The selection of a transmission line for onwards transmission may exclude the transmission line used by the previous network node to forward the data to the gate.

In embodiments, the gates of the system are of the same type. In embodiments, the gates of the system have the same physical structure. In some cases, the gates of the system are structurally identical. The gates therefore include the same interfaces and have the same capabilities (i.e. for communication via at least powerline, wifi, ethernet, and Bluetooth). In some embodiments, some of the gates in the network are configured to communicate with mobile bases (e.g. via radio communication) and others are not. The latter group of gates can be used only for routing of data through the network and may include only interfaces required for this purpose (such as only the wired and wireless interfaces used to communicate between pairs of gates within the network).

In embodiments, receipt of a data package by the at least one gate causes software, or determining means, comprised as part of the gate to access the current gate status. This information is then used in order to decide which transmission line to use to forward the data to the next gate or node in the network. The current gate status, which may be related to the current status of the transmission lines providing direct communications links from the gate to other gates in the network, to front-end devices, or to a central controller, is determined frequently by the gate (such as periodically or every time a certain number of data packages has been sent through the network or gate). The current gate status is accessed by the gate every time a data package is received at the gate for onwards transmission. In some cases properties of the data package are also determined and used in the selection of a transmission line for onwards transmission. This may be true for each gate of the network if several gates of the same type are present.

The properties of all of the transmission lines or interfaces leading out of the gate may be calculated each time the current gate status is updated. In this way, all of the transmission lines providing direct connections with other entities in the network (i.e other gates, the central controller, or front-end devices) are analyzed and considered as possible onward routes for transmission of the data package. The selection of a transmission line is independent of which type of communication technology is used (aside from the effect this has on the property of the transmission lines or interfaces that is assessed). Wireless and wired transmission lines alike are assessed during a gate status update, after which the results or information derived from the results are stored as part of the current gate status. Data packages can then be forwarded based on the results of the assessment when the gate status is accessed.

The destination for the data package may be a specified destination gate within the network, may be a front-end device (possibly including a display and accessible by a crew member), may be a mobile device carried by a crew member for monitoring, or may be a central controller. The data package may include a message with a warning or instructions for sending to a mobile or front-end device carried by a crew member, may include a warning sent from a device carried by a crew member to another device, or to a central control, and may include sensor or positioning data sent from a mobile device carried by a crew member to a destination gate, front-end device, mobile device, or central controller.

If a property of the data package is also used to select a transmission line for onwards transmission of the data package, then the property of the data package may comprise information in an IP package. The IP package may include IP addresses for one or both of the source and destination, and in some cases also a header and any additional information used for routing. Only the destination IP address, along with the current gate status, may be used by the gate to select an interface for onward transmission. In embodiments, the property of the data package may be a data type. This may be workable if data of a particular type is consistently required to be sent in a particular direction within the network, or to a particular destination, for example.

In embodiments, the wired transmission line is a powerline communications link and the wireless transmission line is a wifi link. In embodiments, the wired transmission line may be an ethernet transmission line. The wifi link may operate at 2.4 GHz or 5 GHz. In some cases two wifi links may be provided at different frequencies (i.e. one at 2.4 GHz and another at 5 GHz). An additional interface may be provided to serve the second wifi link, but most often the same wireless interface will serve both wifi links. The same interface may serve all wireless transmission lines coupled to the gate and another single interface may serve all wired transmission lines coupled to the gate. The gates may each comprise a single wireless interface and a single wired interface (as well as potentially an ethernet interface or interfaces for the use of alternative communication technologies). The gates can, however, alternatively comprise separate interfaces for some or each of the different transmission lines leading out of the gate, such as for wifi transmission of data at 2.4 GHz and 5 GHz. The gate can therefore comprise an interface for coupling with a powerline or another wired transmission line, an interface for coupling with a wifi transmission line at 2.4 GHz, and an interface for coupling with a wifi transmission line at 5 GHz. The gate can also comprise a Bluetooth interface. Use of powerline communication reduces the additional wiring required to fit the communication system in a location, and wifi provides a quick and efficient option for data transfer when sufficient signal strength is available. Whichever configuration for the interfaces is used, a property of each of the transmission lines or each of the interfaces present may be tested whenever the current gate status is updated, and this information used to determine which will provide the most efficient route by which to send the data on. The properties of several transmission lines leading out of a single interface may be measured and used to provide weightings as part of the current gate status during each update.

Each gate may comprise a plurality of wired transmission lines and/or a plurality of wireless transmission lines, the wired transmission lines may use the same or different wired interfaces, and the wireless transmission lines may use the same or different wireless interfaces of the gate. The property of each transmission line may be determined (and may be measured by the gate in some cases) each time the gate status is updated, and this information used to update the gate status.

A further interface for coupling with an ethernet transmission line may also be present. This can be used for direct communication between gates, but will most often be used for direct coupling of the gate to a central controller or front-end device (if the front-end device has a fixed position). The ethernet interfaces may therefore only be in use for the gate or gates located physically nearest to the controller. In embodiments, the at least one gate comprises at least one interface coupled to an ethernet transmission line for ethernet communication with another gate of the network and/or with a system controller. This may be true for each gate of the network if several gates of the same type are present. All of the network gates in this case also have the capability to send data via ethernet, further increasing the flexibility of the system. Although the ethernet interface may not be in use for all gates of the network, all gates can include such an interface. The same goes for some of the wired and wireless interfaces where more than one of each is present as part of a gate. The network is therefore adaptive also in the sense that the positions of the gates and the transmission lines provided between pairs of gates in the network can be altered in response to changing environment (new walls being built, new powerlines providing potential data links, and so on). New gates can also easily be added to the network to increase the network range at any time.

In embodiments, the wired interface or an additional wired interface is coupled to an ethernet transmission line for ethernet communication with another gate of the network and/or with a system controller. In embodiments, the wireless interface or an additional wireless interface is coupled to a Bluetooth transmission line for Bluetooth communication with another gate of the network and/or with a system controller.

In embodiments, the at least one gate in the network is configured as a reader for wireless communication with one or more mobile devices of a crew monitoring system. This may be true for each gate of the network if several gates of the same type are present. In embodiments, the wireless communication uses a radio link. In embodiments, each gate in the network is configured as a tag reader, each mobile device of the crew monitoring system comprises a radio frequency tag, and the gates are configured to identify the at least one mobile device based on detection of the radio frequency tag. In embodiments, the adaptable communication system comprises the at least one mobile device, and functions as a crew monitoring system. The mobile devices may be configured to be carried or worn by crew members, such as around the wrist or ankle (a wristband or ankle band). The gates forming the communication network may be further configured to receive positional and other information relating to passengers or personnel from the mobile devices. The integration of the adaptable network formed of a plurality of gates into a crew monitoring system for a vessel by using the gates as readers to detect mobile devices carried by crew members provides particular advantages. The adaptability in response to network availability means that response to emergency situations can be more rapid even where wireless communication between gates is temporarily interrupted in some areas of the ship. Information regarding the whereabouts of the various crew members can reach a central controller or destination gate in the shortest possible time, irrespective of where the crew member is on the ship and current network conditions.

In embodiments, the at least one gate is configured as a radio frequency reader, each mobile device of the crew monitoring system comprises a radio frequency tag, and the gates are configured to identify the at least one mobile device based on detection of the tag by the reader, or to forward data received from the mobile bases to the central controller. This may be true for each gate of the network if several gates of the same type are present. Provided that the tag of a mobile device is within range of the gate, the crew member carrying the tag can be identified and a position (at least as accurate as the size of the read range) can be communicated to a destination gate or a central controller via the network. A more accurate position can be determined using UWB or other long-range signals, for example for triangulation using nearby gates. In such a case the gates are also configured to receive this positioning data and to send it onwards through the network as part of the data package.

In embodiments, the at least one mobile device comprises sensors and is configured to send sensor data, or data derived from the sensor data, to the gates of the network via wireless communication means. The wireless communication means may be Bluetooth (BTLE is particularly advantageous). Sensors may be biometric sensors, such as heartrate, temperature, or blood pressure sensors, or may be one or more of acceleration sensors, pressure sensors, and so on. The data package may therefore comprise sensor data (or information derived from sensor data) received at the gate from a mobile device, positioning information received at the gate from the mobile device, and in some cases also ID information detected by the reader and received from the mobile device.

The Bluetooth or other wired or wireless capabilities of the gates of the network can also allow them to receive data from additional sensors and/or third party devices. Gates can be configured to receive sensor data from sensors such as pressure sensors, GPS sensors, or thermometers. Data can be sent from a thermometer or another sensor permanently located within a particular room of the vessel, such as within the engine room. The sensor or sensors can periodically broadcast sensor measurements (or information derived therefrom) to an adjacent gate which then forwards this through the network to a front-end device, controller, or destination gate as described above. Sensors can be configured to broadcast data or a warning only when a threshold is exceeded in some cases. Any third party device using Bluetooth can be integrated easily into the system thanks to the Bluetooth capabilities of each of the system gates.

In embodiments, the at least one gate, and in some cases all gates in the network, are configured to receive data from and send data to the at least one mobile device over wireless long or short wave radio.

In embodiments, the property of the data package comprises one or all of a destination for the data, the ID of the preceding gate or entity along the path followed by the data package, and a source of the data package (which may be a source gate). Knowledge of the direction from which the package was sent can allow the gate to determine a preferred direction for onwards transmission (continuing transmission in the same or a similar physical direction if possible). Information regarding a destination for the data package, which may be comprised as part of the data package itself, can be used in a similar way but this requires each gate to have some structural knowledge of the network. Wider knowledge of the network is not required if a gate simply recognizes the direction from which the package was sent and forwards this on in as close to the same direction as possible.

In embodiments, the property of the data package comprises one of information identifying a destination for the data, information identifying the source of the data, or information identifying the previous gate in the data pathway. In embodiments, the property of the data package comprises the source or destination IP address. In embodiments, the at least one property of the data is the ID of the preceding gate, the source IP, or the destination IP.

In embodiments, the at least one gate is configured to update a current gate status based on a measured transmission speed of the wired and wireless transmission lines. This may be true for each gate of the network if several gates of the same type are present. Transmission speed can, in some cases, be determined by sending test data along each transmission line which is then returned along the same transmission line. The time of arrival of the returned test data can provide information regarding transmission speed for each line. Although a transmission speed is a useful metric, any metric can be used which will reflect the speed and efficiency of data transfer at the time of the gate status update through each of the transmission lines or interfaces at issue. The test can be performed by the gate itself (i.e. but measuring means comprised as part of the gate).

In embodiments, the at least one gate is configured to update the current gate status when a transmission line failure is detected for one of the wireless or wired transmission lines. This, as well, may be true for each gate of the network if several gates of the same type are present. The gate status is therefore also updated whenever a transmission line failure is detected on one of the wireless and wired transmission lines leading out of that gate. A transmission line failure will correspond to a transmission speed for that line of zero. Each gate in the network can comprise a failure detection means which monitors the transmission lines and will cause an additional gate status update to be carried out in the event of a transmission line failure being detected on that gate. In some cases the failure detection means may cause an additional gate status update to be carried out in the event of a transmission line failure being detected on any of the gates. The gate update will result in the weighting for that line being updated so that data will not be sent via that transmission line (i.e. set to a maximum such as a value of 100 in the example described above), or some other metric being assigned to the failed transmission line which will mean that the gate will no longer try to send data via that line. If the transmission line begins functioning again or is fixed due to manual intervention, the following gate status update will again assign it a weighting or metric which will allow data to be sent via that line. This provides a very efficient way to deal with failure of transmission lines and means that the network is able to immediately adapt to a failure event and recover functionality once the cause is dealt with. Updates are therefore carried out repeatedly according to preset rules (i.e. a particular time period between updates or a particular number of packets being sent by the gate between updates), but also immediately following detection of a transmission line failure.

In embodiments, the network includes additional gates with only wired or only wireless active interfaces. Some of the gates in the network may therefore use only their wired or wireless interfaces to communicate with other gates of the network.

This may be useful where parts of the network will never have access to a wireless connection, or where there is no powerlines available for wired transmission, for example. Some of the network will still be adaptable to switch between wired and wireless transmission of data, as described above.

According to a second aspect of the present invention, there is provided an adaptable communication system for a vessel comprising: a network of gates, each gate comprising at least one wireless interface coupled to a wireless transmission line for wireless communication with another gate of the network and at least one wired interface coupled to a wired transmission line for wired communication with another gate of the network; wherein the gates are each configured to: whenever the system is in operation and the gate is active, repeatedly update a current gate status based on at least one current property of each of the wired and wireless transmission lines or at least one current property of each of the wired and wireless interfaces; receive a data package; select a transmission line based on the current gate status; and send the data package onwards towards a destination via the selected transmission line.

According to a third aspect of the present invention, there is provided a gate for an adaptable communication system comprising: at least one wireless interface for coupling to a wireless transmission line for wireless communication with another gate in the network and at least one wired interface for coupling to a wired transmission line for wired communication with another gate of the same type; wherein the gate is configured to: repeatedly update a current gate status based on a property of each of the transmission lines or a property of each of the interfaces coupled to the transmission lines; receive a data package; select a transmission line to use for onward transmission of the data package based on the current gate status; and send the data onwards towards a destination via the selected transmission line.

In embodiments, the gate comprises at least one interface for coupling to an ethernet transmission line for ethernet communication with another gate of the same type and/or with a system controller.

In embodiments, selecting the transmission line to use for onward transmission of the data package is also based on one or more properties of the data package.

In embodiments, the gate is configured as a reader for wireless communication with mobile devices of a crew monitoring system.

In embodiments, the gate is configured as an reader for reading a radio frequency tag on a mobile device to identify the mobile device or receive data from the mobile device.

In embodiments, the gate is configured to receive data from and send data to the mobile devices over wireless long or short wave radio.

In embodiments, the gate is configured to send data to the mobile device, and to receive data from the mobile device, via Bluetooth.

According to a third aspect of the present invention, there is provided a method for communication in an adaptable network comprising a plurality of gates each comprising at least one wireless interface for coupling to a wireless transmission line for wireless communication with another gate in the plurality of gates and at least one wired interface for coupling to a wired transmission line for wired communication with another gate in the plurality of gates, the method comprising: while the system is in operation, repeatedly updating, by each gate, a gate status based on at least one property of the wired and wireless transmission lines or based on at least one property of the wired and wireless interfaces of that gate; receiving, by a gate, a data package; selecting, by the gate, a transmission line based on the current gate status; and sending, by the gate, the data package onwards towards a destination via the selected transmission line.

Embodiments of the present invention will now be described, by way of example only, with reference to the following diagrams wherein.

Figure 1:
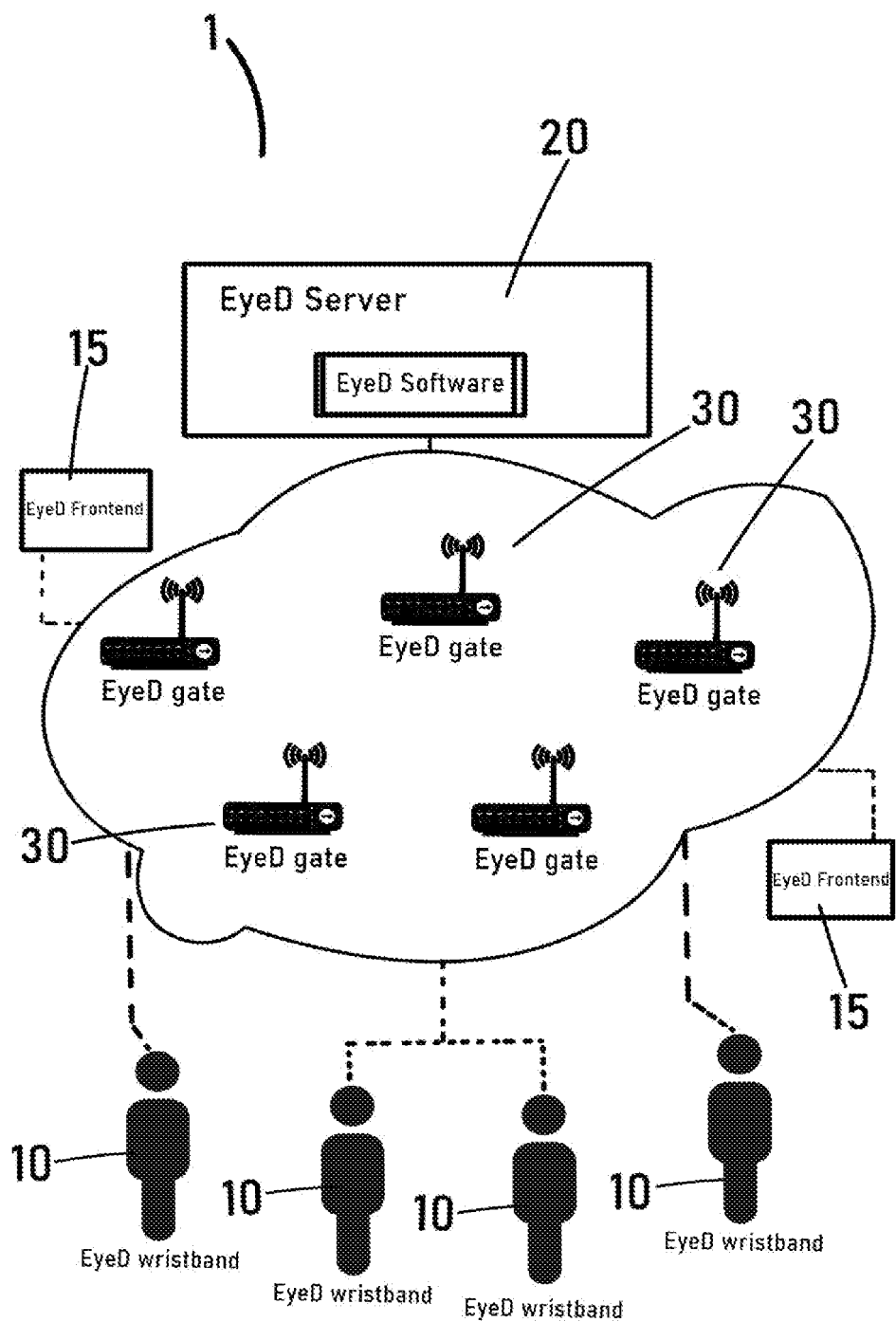
FIG. 1 illustrates an example network including a plurality of nodes and a main controller.

An adaptable communication system suited for use on a marine vessel comprises a plurality of communication nodes or gates distributed around the vessel. An example of such a system is shown in FIG. 1, which illustrates a network made up of a set of gates 30 configured to transmit data between themselves as will be described further below. Each of these gates 30 is directly communicatively coupled to at least one other gate in the network 1, and gates are coupled indirectly to all of the other gates in the network. Direct communicative coupling refers to the fact that a direct link exists between a pair of gates 30 so that data can pass between the two gates without first passing through another gate or another device of the system. An indirect link means that the data must pass through another device or gate in order to travel between a pair of gates via that link. The system also comprises a central controller 20, which in this case is a server device including processing software for creating data packages and processing received data packages. Data packages can be passed from any of the gates to and from the central controller directly or via one or more other gates in the network.

The gates 30 can be located in different areas of the vessel or building, which may mean that they are located in different rooms of a deck, or spaced apart from one another on an open deck. The gates in the network may be within a direct line of sight of some of the other network gates, and out of sight of others, for example if some of the gates are located on a different deck or in a walled area of the ship.

Apart from the gates 30 and the central controller 20, the system may also include front end devices 15 which may be portable or non-portable devices, such as mobile phones, laptops, iPads, tablets, or PCs. The front-end devices 15 can include display capabilities, and can be carried or accessed by staff members in order to observe the state of the system or to receive or send messages via the network of gates. Two such devices are shown in FIG. 1.

The network also includes a plurality of mobile devices 10, which are designed to be carried or worn by people on board the ship. In some cases, the network is designed to send data regarding the location and/or status of personnel or passengers on board the vessel. Hereafter, reference will be to crew members, however the group being monitored by the system may include passengers as well as employees on board the ship, or may comprise only passengers. In order to achieve this monitoring function, a set of people to be monitored can be provided with mobile devices 10, which may be in the form of wristbands or other devices which are wearable or attachable to the body for wireless communication with the gates of the system. Communication between the gates and the mobile devices can be by any wireless means.

One preferred technology for communication between the mobile devices and the gates is radio (long wave and/or short wave). In one example, the mobile devices can each be provided with a radio frequency tag for communication with readers comprised as part of the gates. This will allow an ID associated with a particular crew member to be identified by the gate or gates nearest to their current location. Additional information can also be sent from the mobile devices to the gates or vice versa. The mobile devices may be provided with various sensors for monitoring the health status of the crew member. These may include temperature sensors, acceleration sensors, heart rate or blood pressure sensors, and so on. Sensor data may be sent in its raw form from the mobile devices to the gates, and on to the system controller, or conclusions may be drawn from the data by software stored on the mobile devices themselves, and indirect information or warnings can be sent in place of or as well as the original sensor data. Sensor data and/or information derived from the sensor data can be sent from the mobile devices to the system gates via radio frequency communication means, such as via Bluetooth, and in a preferred example Bluetooth low energy (BTLE). Positions of the mobile devices can be derived based on the known position of the gate reading the mobile device ID. Mobile devices can also in some cases send additional positioning information, such as via UWB. This can provide an accurate signal for triangulation of the mobile base by three nearby readers, for example. UWB is particularly suitable due to its long range, but other long-range signals can be used for positioning in some cases.

The gates themselves may each therefore function as a tag reader, may be set up for Bluetooth communication with mobile devices in order to send and receive sensor and other data, and may include interfaces for communication with the remainder of the network of gates via two or more of powerline communication, wifi, and ethernet. The Bluetooth interfaces can also be used for direct communication between gates of the network in some cases. All of the gates in the system may have the above capabilities, although which capabilities are utilised for each gate at any particular time and in what way will depend on the positioning of the gates within the larger network and environmental conditions.

The gates of the system are specifically adapted to allow for flexible mixed communication, as will be described in detail below. Reference to a mixed communication network or a mixed network is to a network in which gates are configured for communication within the network, and usually within at least one given pair of gates, via at least two different communication technologies. Preferably, where direct communication is possible between any pair of gates, at least two transmission lines using two different communication technologies are available to send data out of the gate. The communication technologies involved may be two or more of wifi, radio communication, powerline communication, ethernet, and so on. The different technologies preferably include at least one wired and one wireless means, such as powerline communication and wifi. Each pair of gates which are directly communicatively coupled together may therefore be communicatively coupled via both wired and wireless transmissions lines (i.e. via powerline and wifi) through different pairs of interfaces. In another example, each gate includes two different interfaces used to communicate with other gates in the system via two different communication technologies, but the transmission lines provide a direct link to different gates of the system.

Figure 2:
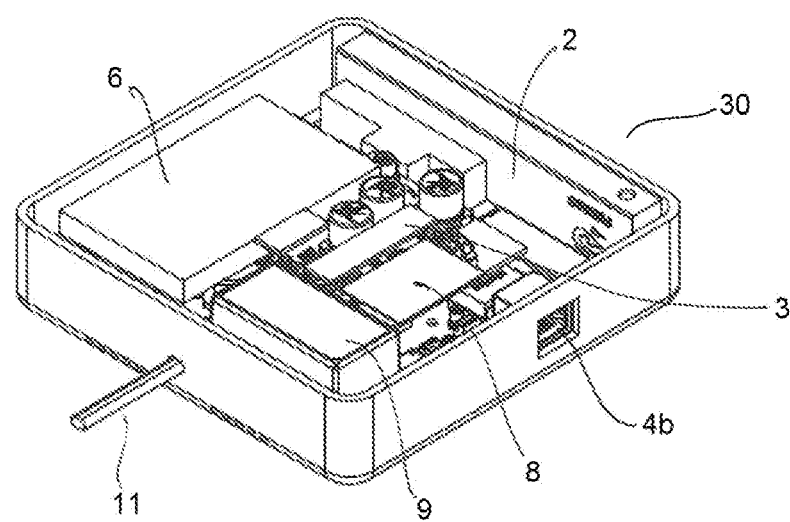
FIG. 2 shows a node which can form part of a communication network on a vessel.
Figure 3:
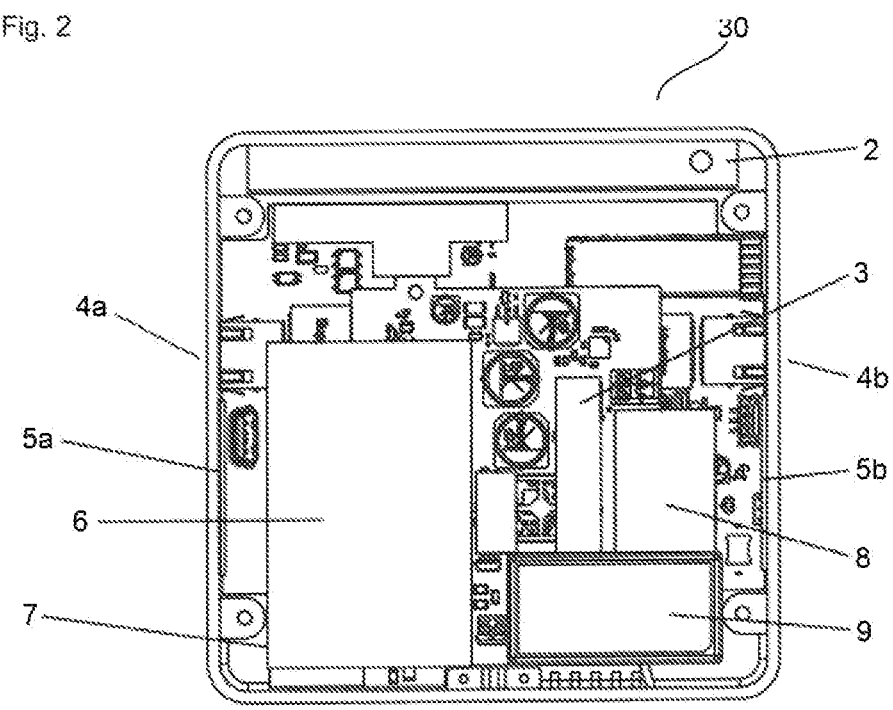
FIG. 3 is a view from above of the node of FIG. 2.

A gate is shown in FIGS. 2 and 3, with the lid removed so that the internal components are visible. The gate comprises an outer housing which is, in this case, box-shaped and may be formed of plastic or another resilient material. Internal to and protected by the housing are an antenna 2, a Bluetooth module 3, two ethernet ports 4a and 4b, two wifi interfaces 5a and 5b, a battery 6 for providing power or back-up power to the gate (this may be rechargeable), a PLC (powerline communication) module 7, a UWB module 8, and an AC/DC converter 9. In FIG. 2, the powerline 11 coupled to the PLC module is visible extending from a side wall of the gate.

The antenna 2 is configured for radio communication with other devices in the network and is preferably a low frequency antenna, which can in some cases by used for communication with mobile bases as part of a crew monitoring system. The Bluetooth module 3 provides an interface for Bluetooth transmission with another Bluetooth enabled device within the network. Again, communication is usually with the mobile devices, which send sensor and other data to their closest gate, but also potentially other gates in the network depending on range. The ethernet ports 4a and 4b provide interfaces for ethernet communication with other devices in the network. Again, this is usually used to provide a direct connection between some or one gate in the network and the central control server, but may also be used to provide direct connections between pairs of gates within the network. Wifi interfaces 5a and 5b couple to wireless transmission lines providing direct wireless links to other gates of the network, and UWB module provides a UWB interface for Ultra-Wide Band communication with mobile bases or other gates. Generally, the UWB interface is used to send positioning data from a mobile base to the nearest gates of the system for accurate positioning of the mobile base. Finally (and optionally), the housing contains an AC/DC convertor.

The gates 30 are configured to be distributed at spaced apart locations around the vessel to form the network 1, and the selected positions will depend on the structure of the ship and the expected availability of various communication technologies at each location. On an open deck, for example, the distance between adjacent gates may be selected so as to provide full coverage for radio communication with mobile devices carried by crew members across the entire deck area. On the lower decks, at least one gate may be placed within each physically separate region of the deck, such as within each room.

Each gate in the system may be identical, and each gate can be adapted to allow communication with other gates within the wider network using at least two different communication technologies selected from powerline communication, wifi, ethernet, and long or short-wave radio communication, as mentioned above. Preferably the at least two technologies will include wifi and powerline communication, meaning that the gates will comprise at least one of each a powerline and a wifi interface that is in use. In order for the powerline communication interface to be connected up, each gate can be pluggable into power sockets on board the ship to connect a powerline of the ship to the powerline interface or module of the gate. Although connection with power cables via other means is possible, and additional power cables can be provided, pluggable gates are most convenient and avoid the need to rewire or adapt the existing infrastructure on board a vessel to any great degree. By providing pluggable gates, a monitoring system adapted for mixed communication can be retrofitted to an existing vessel very easily. Each deck onboard the vessel can include a concentrator, which acts as a central hub for data powerlines, and which can be used to connect the different decks in order to allow data to be sent between gates located on different decks of the vessel (or floors of a building).

Aside from being coupled to powerlines of the vessel via a powerline communication interface, the gates include at least one additional interface for communication using a different communication technology. The additional interfaces preferably include at least one wifi interface, and may also include at least one ethernet interface. Gates within range of each other can communicate either via wifi using their respective wifi interfaces, or via powerline communication via their respective powerline communication interfaces by sending data along powerlines connecting the two gates. In some cases, pairs of gates can also communicate via ethernet via an ethernet link coupled to their respective ethernet ports.

In order to send data via the network from a source (which may be one of the gates in the network or the system controller) to a destination (e.g. another of the network gates or the system controller), a structure similar to a mesh network is utilised, with the gates representing nodes of the network. However, while a traditional mesh network uses a particular communication technology (usually wifi) to transfer data between nodes in the network, the present network is adapted to allow switching between different communication technologies for a particular data type to provide a much higher degree of flexibility. The switching is also carried out repeatedly and is executed individually by each of the gates in the network, rather than centrally. This flexibility is crucial in a situation where the network is used to provide a crew monitoring system on board a ship, because the availability of wifi and other communication technologies can vary widely both from one area of the vessel to another and over time due to the changing position of the system while the ship is on the move.

The network structure can mean that each individual gate to which the data is transmitted on the way from source to destination is aware only of the data itself and of which direction this has been sent from. The gate then forwards the data in a direction towards the destination via what it deems to be the quickest or most efficient route. For each gate, this may involve transmitting data via the powerline communication interface, via the wifi communication interface, or via another interface if present. Which of these provides the most effective choice at any one time will depend not only on static factors such as where the node is physically located on the vessel and the capabilities of that particular node, but also on varying factors, such as where the ship itself is located, the weather, and availability of wifi signals in the area where the node is located at that time. The most efficient route for data can also depend on the status of the powerline network for that gate and connected gates, such as how much additional data is being sent using the same cables at one time or in what other way the cables are being utilised.

The gate needs to be able to adapt its behaviour depending on changing environmental factors, and this is achieved by providing the possibility of repeatedly changing the weights associated with different interfaces to enable selection of the best data route whenever a data package is received by the node and needs to be sent onwards. At least some of the weights for the transmission lines or interfaces may be non-zero. In some cases, the weights may each have a value between 0 and 100. The route that a data package follows through the network depends on decisions taken by each of the gates it passes on the way from source to destination.

Figure 4:
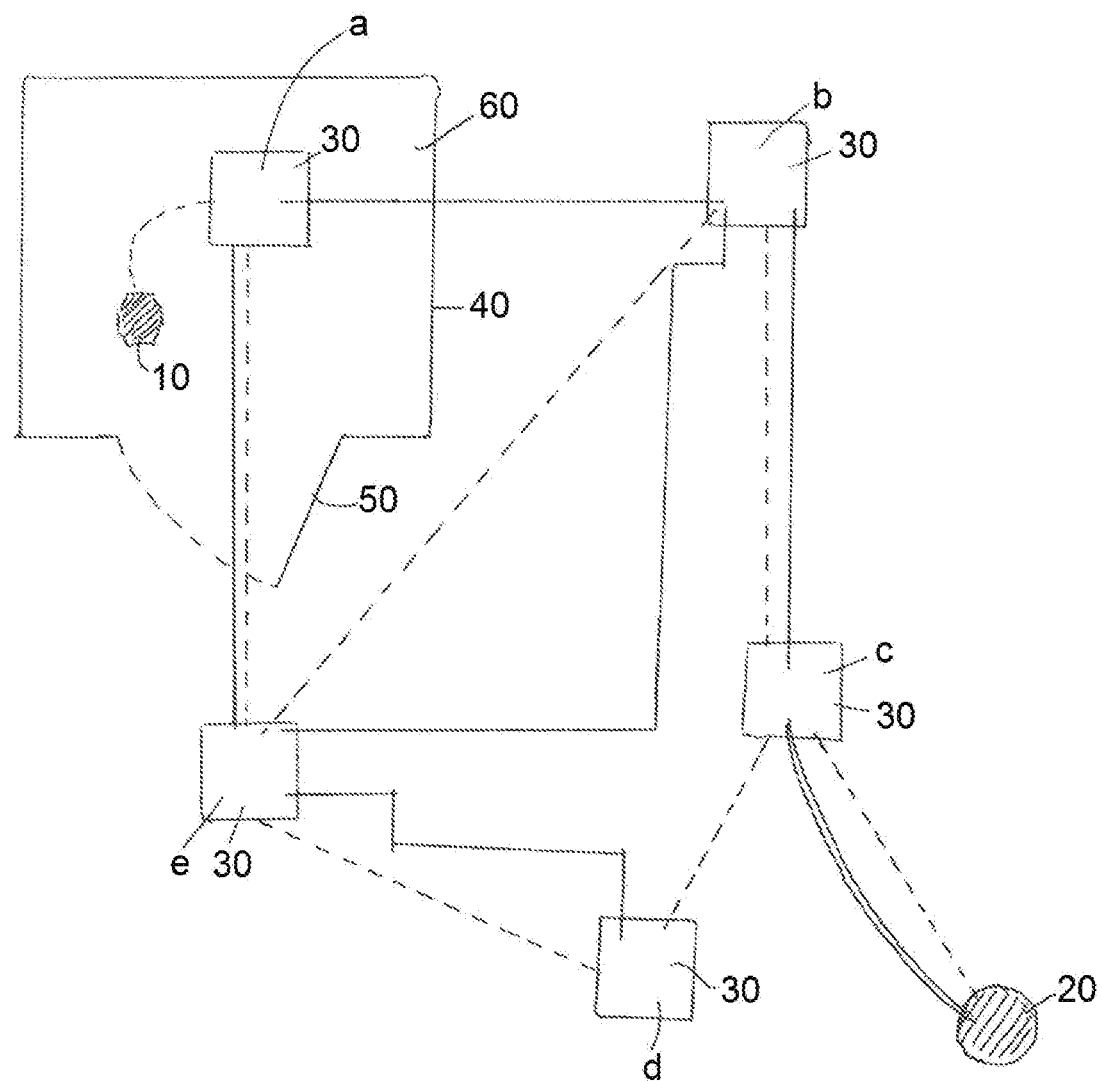
FIG. 4 illustrates one possible configuration for a network.

Not only does the processing software of the gate determine the optimum gate to send data through next, but also which communication technology to use to do so. This decision is taken based on a gate status, which is constantly updated, and which may comprise a weighting associated with each of the transmission lines leading out of the gate (or at least those which are set up for communication with other nodes in the network). A basic example of the adaptable behaviour of the network is shown in FIG. 4. Here the network includes 5 gates, labelled gates 'a'-'e'. Obviously, in a real situation the number of gates in a crew monitoring system installed on a ship will be much higher, and may be in the tens or hundreds, for communicating with several hundred mobile devices attributed to personnel on board. Data is received at gate 'a' from a mobile device and comprises a data package including sensor data collected by the mobile device, which is to be sent to the system controller via the network of gates.

Gate 'a' is coupled to directly to gate 'b' via wired connection only (solid line), since a steel wall 40 is positioned between the pair of gates which wireless signal cannot penetrate. Communicative coupling with gate 'c' is indirect only. A wireless connection (dotted line) between gate 'a' and gate 'e' may be possible if the steel door 50 to the room 60 housing gate 'a' is open, and a further direct wired connection is provided between these gates. Both wired and wireless connections are also provided between each pair of gates 30 'b' and 'c', 'b' and 'e', and 'd' and 'e'. A wireless connection is provided between gates 'c' and 'd'. The system controller 20 is communicatively coupled to gate 'c' of the system by way of an ethernet connection (double line) via the gate's ethernet interface and by way of a wireless connection. The ethernet interfaces of gates 'a', 'b', 'd', and 'e' are not in use. Obviously, connection with the system controller may by via any wired or wireless means, and a direct connection may be provided to more than one gate or all gates of the system. This is an example configuration, however whether connections between pairs of gates are provided by powerline communication, wifi, ethernet, Bluetooth, or two or more of the above, will depend on the layout of the ship's decks, rooms, powerlines, and so on. The system is readily configurable to fit such a layout using a set of gates, each of which has all of the capability described above. Each gate in the system may be identical and may therefore include all of the same interfaces.

When gate 'a' receives the data from mobile device 10 within room 60, the processing software gate 'a' accesses the current gate status, which comprises a weighting for each of the available transmission lines out of that gate, and selects which of the available transmission lines to use to send the data onwards. The options available to gate 'a' in this case, assuming that the door to room 60 is open, are wired transmission to gate 'b', wireless transmission to gate 'e' or wired transmission to gate 'e'. After determining that a strong connection is available to gate 'e' via wireless connection (i.e. if lower values apply to more preferred transmission lines then a weighting value for transmission line e is lower than for the other two transmission lines), gate 'a' decides to send the data to gate 'e' via its wireless interface and the wireless transmission line. The data is received at gate 'e', which then carries out the same process to decide how to send the data onwards. Gate 'e' may also be aware that the data was received from gate 'a', and its decisions will be weighted towards sending data in a direction away from gate 'a' if possible, such as towards gate 'd' or 'b', in order to converge on its destination (in this case controller 20). The same will be true if gate 'e' is aware that the destination for the package is the controller. This information may be provided as part of the packet header. Gate 'e' decides to send the data package via wired connection to gate 'd', because of a weak wireless connection at the time of its previous status update between gates 'e' and 'd'. Gate 'd' receives the data, is weighted towards sending the data in a direction away from gate 'e' (towards gate 'c'), and does so by sending data via wireless connection to gate 'c' based additionally on the current gate status at gate 'd'. Gate 'c' executes the same process and finally transmits the data to the controller via an ethernet link between the two.

The same network of gates located in the same areas of the ship may send a data package via a different route if, for example, the door to room 60 is closed, or wireless connection between gates 'a' and 'e' is weaker due to a changed location of the vessel. Every time a gate status update is carried out, the possibility of changing a weighting for the transmission lines, which may mean switching from wired to wireless communication or vice versa for that gate, is available. This way the most efficient route by which to send the data is determined. The same principle can be used in a situation where gates are provided with three or more interfaces using different communication technologies (e.g. ethernet, wifi, and powerline communication). The repeated gate status updates function in a similar way to determine the best interfaces to use to send the data to which gate, but weightings are allocated to transmission lines out of each of three or more interfaces rather than two. Any number of interfaces, any number of transmission lines per interface, and any number of different communication technologies can be used.

Selection of weightings for the interfaces or transmission lines may comprise an analysis of the transmission speed of the various transmission channels providing direct connections to adjacent gates in the network. This analysis may be carried out by the gate itself. Each direct connection coupled to the gate can be tested simultaneously or one by one. This can be done, for example, by sending a test message along the transmission line and measuring a response, as discussed above. Other methods for identifying the transmission line with the fastest transmission rate can be used, or other metrics can be used rather than the transmission speed. In some cases, weightings may directly reflect the transmission speeds (twice the transmission speed=weighting value halved). Once the weightings are identified, irrespective of which interface it is connected through and which communication technology is used to transmit data along that transmission line, these are used to decide how to forward the received data packets to the next gate through which the data passes on the way from a source to its destination. Obviously, higher weighting values may apply to more preferred transmission lines in some cases, rather than lower.

The invention claimed is:

1. A communication system for a vessel comprising:
a network comprising a plurality gates, each gate of the plurality of gates comprising at least one wireless interface coupled to a wireless transmission line for wireless communication with another gate of the network and at least one wired interface coupled to a wired transmission line for wired communication with the other gate of the network; wherein each gate is configured to:
whenever the system is in operation and the gate is active, repeatedly measure a property of the wired and wireless transmission lines or a property of the wired and wireless interfaces and update a current gate status based on the measured property;
receive a data package;
select a transmission line based on the current gate status; and
send the data package onwards towards a destination via the selected transmission line, wherein the property is measured and the current gate status is updated periodically at predetermined time intervals or each time a fixed number of data packages has been sent onwards by the gate, wherein the fixed number is 2 or more.

2. The communication system of claim 1, wherein the method comprises measuring a value of the property of the wired and wireless transmission lines or interfaces, and wherein the gate status comprises a set of weightings reflecting the measured values.

3. The communication system of claim 2, wherein the current gate status is updated periodically and the interval between successive gate status updates is between 1 second and 5 minutes in duration.

4. The communication system of claim 1, wherein the current gate status is updated each time a fixed number of data packages has been sent onwards by the gate and the fixed number of data packages is between 2 and 10000.

5. The communication system of claim 1, wherein each gate is configured to select a transmission line based on at least one property of the data package.

6. The communication system of claim 1, wherein the wired transmission line is a powerline communication link and the wireless transmission line is a wifi link.

7. The communication system of claim 1, wherein the wired transmission line and the wireless transmission line provide a direct communications link to the same other gate of the network.

8. The communication system of claim 1, wherein at least one gate of the plurality of gates comprises an additional interface coupled to an additional wired or wireless transmission line and, while the system is in operation, the gate is configured to repeatedly update the current gate status based on at least one measured property of the wired transmission line, the wireless transmission line, and the additional wired or wireless transmission line, or at least one measured property of the wired, wireless, and additional interfaces.

9. The communication system of claim 1, wherein each gate is configured as a reader for wireless communication with one or more mobile devices of a crew monitoring system.

10. The communication system of claim 5, wherein the property of the data package comprises one of information identifying a destination for the data,
information identifying the source of the data, or information identifying the previous gate in the data pathway).

11. The communication system of claim 10, wherein the property of the data package comprises the source or destination IP address.

12. The communication system of claim 1, wherein the at least one gate is configured to update the current gate status based on a measured transmission speed of the wired and wireless transmission lines.

13. The communication system of claim 1, wherein each gate is configured to update the current gate status when a transmission line failure is detected for one of the wireless or wired transmission lines on any of the gates of the network.

14. The communication system of claim 1, wherein the wireless interface is coupled to a wireless transmission line for direct wireless communication with another gate of the same type and the wired interface is coupled to a wired transmission line for direct wired communication with the other gate of the same type.

15. A gate of communication system for a vessel comprising:
- at least one wireless interface for coupling to a wireless transmission line for wireless communication with another gate of the same type and at least one wired interface for coupling to a wired transmission line for wired communication with another gate of the same type; wherein the gate is configured to:
- whenever the system is in operation and the gate is active, repeatedly measure a property of the wired and wireless transmission lines or a property of the wired and wireless interfaces and update a current gate status based on the measured property;
- receive a data package;
- select a transmission line based on the current gate status; and
- send the data package onwards towards a destination via the selected transmission line, wherein the property is measured and the current gate status is updated periodically at predetermined time intervals or each time a fixed number of data packages has been sent onwards by the gate, wherein the fixed number is 2 or more.

16. A method for communication in a communication system for a vessel comprising a plurality of gates, each gate comprising at least one wireless interface for coupling to a wireless transmission line for wireless communication with another gate in the plurality of gates and at least one wired interface for coupling to a wired transmission line for wired communication with another gate in the plurality of gates, the method comprising:
- whenever the system is in operation, repeatedly measure, by each gate, a property of the wired and wireless transmission lines or a property of the wired and wireless interfaces of that gate and updating, by each gate, a gate status based on the measured property;
- receiving, by a gate of the system, a data package;
- selecting, by the gate, a transmission line based on the current gate status for that gate; and
- sending, by the gate, the data package onwards towards a destination via the selected transmission line, wherein the property is measured and the current gate status is updated periodically at predetermined time intervals or each time a fixed number of data packages has been sent onwards by the gate, wherein the fixed number is 2 or more.

* * * * *